United States Patent
Mitsuhashi

(10) Patent No.: US 10,741,804 B2
(45) Date of Patent: Aug. 11, 2020

(54) LAMINATED BATTERY FOR SERIAL CONNECTION AND BATTERY PACK

(71) Applicant: TOYOTA JIDOSHA KABUSHIKI KAISHA, Toyota-shi, Aichi (JP)

(72) Inventor: Hideto Mitsuhashi, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 81 days.

(21) Appl. No.: 15/817,541

(22) Filed: Nov. 20, 2017

(65) Prior Publication Data

US 2018/0151853 A1    May 31, 2018

(30) Foreign Application Priority Data

Nov. 28, 2016    (JP) .................. 2016-230477

(51) Int. Cl.
*H01M 2/06* (2006.01)
*H01M 2/10* (2006.01)
*H01M 2/02* (2006.01)
*H01M 2/20* (2006.01)

(52) U.S. Cl.
CPC ............ *H01M 2/06* (2013.01); *H01M 2/021* (2013.01); *H01M 2/0212* (2013.01); *H01M 2/0237* (2013.01); *H01M 2/1061* (2013.01); *H01M 2/1077* (2013.01); *H01M 2/204* (2013.01); *H01M 2/206* (2013.01); *H01M 2220/20* (2013.01); *H01M 2220/30* (2013.01)

(58) Field of Classification Search
CPC ......... H01M 10/04–0463; H01M 10/05–0525; H01M 2/02–0247; H01M 2/20–206; H01M 2/06

See application file for complete search history.

(56) References Cited

U.S. PATENT DOCUMENTS

| | | | | |
|---|---|---|---|---|
| 6,040,082 A | * | 3/2000 | Haas | A61N 1/378 429/131 |
| 2006/0099499 A1 | * | 5/2006 | Kim | H01M 10/052 429/164 |
| 2007/0269714 A1 | * | 11/2007 | Watanabe | H01M 10/0436 429/120 |
| 2012/0183840 A1 | * | 7/2012 | Lee | H01M 2/1077 429/158 |
| 2012/0196174 A1 | * | 8/2012 | Mikus | H01M 2/0207 429/153 |
| 2014/0227573 A1 | * | 8/2014 | Kwon | H01M 2/022 429/99 |

FOREIGN PATENT DOCUMENTS

| | | |
|---|---|---|
| JP | 2004-31194 A | 1/2004 |
| JP | 2004-164905 A | 6/2004 |
| JP | 2007-311264 A | 11/2007 |
| JP | 2012-221804 A | 11/2012 |

* cited by examiner

*Primary Examiner* — Jonathan G Leong
*Assistant Examiner* — Jacob Buchanan
(74) *Attorney, Agent, or Firm* — Sughrue Mion, PLLC

(57) ABSTRACT

The present invention provides a battery pack that has a plurality of laminated batteries arranged in an array direction. In the plurality of laminated batteries, positive electrode terminals and negative electrode terminals are connected in series, and in the array direction, a distance between the positive and negative electrode terminals that are electrically connected to each other is relatively shorter than a distance between the positive and negative electrode terminals that are not electrically connected to each other.

3 Claims, 4 Drawing Sheets

LAMINATED BATTERY FOR SERIAL CONNECTION AND BATTERY PACK

CROSS REFERENCE TO RELATED APPLICATIONS

The present application claims priority based on Japanese Patent Application No. 2016-230477, filed on Nov. 28, 2016, the entire contents of which are hereby incorporated by reference into the present specification.

BACKGROUND OF THE INVENTION

1. Field of the Invention

The present invention relates to a laminated battery for serial connection and a battery pack having a plurality of laminated batteries connected in series.

2. Description of the Related Art

Battery packs (also called "modules") each having a plurality of secondary batteries connected electrically to each other are generally used as in-car high-output power sources and the like. Examples of such battery packs include a battery pack in which a plurality of laminated batteries are electrically connected to each other. FIG. 4 is a plan view that schematically shows an outline of a battery pack 100 according to a conventional aspect. In the battery pack 100 shown in FIG. 4, a plurality of laminated batteries 100A to 100E are disposed along an array direction X0. A positive electrode terminal 120 and a negative electrode terminal 140 protrude from right and left ends of each of the laminated batteries 100A to 100E in a width direction W0. In each of the laminated batteries 100A to 100E, the positive electrode terminal 120 and the negative electrode terminal 140 are disposed in the middle (center) of the laminated battery in the array direction X0. In other words, in each of the laminated batteries 100A to 100E, the positive electrode terminal 120 and the negative electrode terminal 140 are disposed in the same position in the array direction X0. The positive electrode terminal 120 and the negative electrode terminal 140 are in line symmetry with respect to the center of each of the laminated batteries 100A to 100E in the width direction W0.

In the battery pack 100, positive electrode terminals 120 and negative electrode terminals 140 of the laminated batteries 100A to 100E adjacent to each other in the array direction X0, are welded to each other. Therefore, the battery pack 100 is connected in series. In the battery pack 100, the positive electrode terminals 120 and the negative electrode terminals 140 of the respective laminated batteries 100A to 100E are disposed at equally spaced intervals at respective right and left ends in the width direction W0. For this reason, there is a distance between the positive electrode terminals 120 and the negative electrode terminals 140 that are welded to each other. Therefore, when welding the positive electrode terminals 120 and the negative electrode terminals 140 to each other, the positive electrode terminals 120 and the negative electrode terminals 140 need to be brought close to each other by bending them significantly. As a result, a load is applied to the laminate exterior package of each of the laminated batteries 100A to 100E, often resulting in damage such as cracks. This lowers the sealing properties of the laminate exterior packages, causing entry of moisture and the like into the laminate exterior packages.

In connection with above, examples of the technique regarding the electrical connection between a positive electrode terminal and a negative electrode terminal of a battery pack include Japanese Patent Application Laid-open No. 2012-221804. In the battery pack disclosed in this prior art document, positive electrode terminals and negative electrode terminals each have a bent portion on which bending is performed. Then, a plurality of secondary batteries are connected in series by welding the positive electrode bent portions and the negative electrode bent portions of laminated batteries adjacent to each other in the array direction.

However, in the battery pack disclosed in Japanese Patent Application Laid-open No. 2012-221804, the positive electrode terminals and the negative electrode terminals need to be bent, which is cumbersome. In terms of cost effectiveness and work efficiency, a technique that enables easy serial connection of a plurality of laminated batteries is demanded. Laminated batteries suitable for serial connection are demanded as well.

SUMMARY OF THE INVENTION

The present invention was contrived in view of these circumstances, and an object thereof is to provide a battery pack having a plurality of laminated batteries connected in series, wherein positive and negative electrode terminals are joined together in a favorable manner. Another object of the present invention is to provide a laminated battery for serial connection.

The present invention provides a battery pack that has a plurality of laminated batteries arranged in a predetermined array direction. The plurality of laminated batteries each have: a laminate exterior package; an electrode body that is disposed on an inside of the laminate exterior package and has a positive electrode sheet and a negative electrode sheet; an electrolyte that is disposed on the inside of the laminate exterior package; a positive electrode terminal that is electrically connected to the positive electrode sheet on the inside of the laminate exterior package and partially protrudes to an outside of the laminate exterior package; and a negative electrode terminal that is electrically connected to the negative electrode sheet on the inside of the laminate exterior package and partially protrudes to the outside of the laminate exterior package, at a side opposite to the positive electrode terminal with respect to the electrode body. In the plurality of laminated batteries adjacent to each other in the array direction, the positive electrode terminal and the negative electrode terminal are connected in series, and in the array direction, a distance between the positive electrode terminal and the negative electrode terminal that are electrically connected to each other is relatively shorter than a distance between the positive electrode terminal and the negative electrode terminal that are not electrically connected to each other.

In the battery pack having this configuration, the positive electrode terminal and the negative electrode terminal that are electrically connected to each other are positioned relatively closer to each other compared to the positive electrode terminal and the negative electrode terminal that are not electrically connected to each other. For this reason, a load applied to each laminate exterior package can be reduced when welding the positive and negative electrode terminals of the plurality of laminated batteries together. In other words, a shape of each laminate exterior package containing the electrode can stably be kept. This can prevent damage such as a crack from forming in each laminate exterior package and consequently lowering of sealing properties.

The battery pack having this configuration can eliminate time and effort to bend the electrode terminals. As a result, not only is it possible to improve work efficiency in manufacturing the battery pack, but also cost reduction can be realized.

Throughout this specification, "laminated battery" means a general battery having a configuration in which an electrode body and an electrolyte are contained in a laminate film used as an exterior package. The laminated battery may be a storage battery (chemical battery) such as a lithium-ion secondary battery or a nickel-hydrogen battery, or a storage element (physical battery) such as an electric double layer capacitor.

Also throughout this specification, such an expression as "distance between a positive electrode terminal and a negative electrode terminal" means a distance between a center of a positive electrode terminal and a center of a negative electrode terminal at a position where an edge of the laminate exterior package in the predetermined array direction intersects with the positive and negative electrode terminals.

In a favorable aspect of the battery pack disclosed herein, the positive electrode terminal and the negative electrode terminal that are electrically connected to each other are connected directly without having a connecting member therebetween, and the positive electrode terminal and the negative electrode terminal that are electrically connected to each other are in parallel with each other. This configuration can not only further improve the work efficiency in manufacturing the battery pack but also favorably reduce the load on each laminate exterior package. Consequently, the effects of the present invention can be exerted on a higher level.

In this specification, the term "parallel" is not literally what it means but indicates that a straight extension of a positive electrode terminal and a straight extension of a negative electrode terminal are disposed at an angle of approximately $-10°$ or more but $10°$ or less, such as $-5°$ or more but $5°$ or less.

In a favorable aspect of the battery pack disclosed herein, the laminate exterior package has first and second films, the first and second films each have a flat portion and a deformed portion that configures a space for containing the electrode body, and outer rim sections of the first and second films are sealed while the deformed portions are layered point-symmetrically. Such a configuration can realize this battery pack more stably and efficiently.

The present invention provides a laminated battery for serial connection, which has: a laminate exterior package having a pair of wide surfaces; an electrode body that is disposed on an inside of the laminate exterior package and has a positive electrode sheet and a negative electrode sheet; an electrolyte that is disposed on the inside of the laminate exterior package; a positive electrode terminal that is electrically connected to the positive electrode sheet on the inside of the laminate exterior package and partially protrudes to an outside of the laminate exterior package; and a negative electrode terminal that is electrically connected to the negative electrode sheet on the inside of the laminate exterior package and partially protrudes to the outside of the laminate exterior package, at a side opposite to the positive electrode terminal with respect to the electrode body. In a thickness direction from one of the wide surfaces of the laminate exterior package to the other wide surface, a position of the positive electrode terminal and a position of the negative electrode terminal are mutually different.

DETAILED DESCRIPTION OF THE PREFERRED EMBODIMENTS

Figure 1:
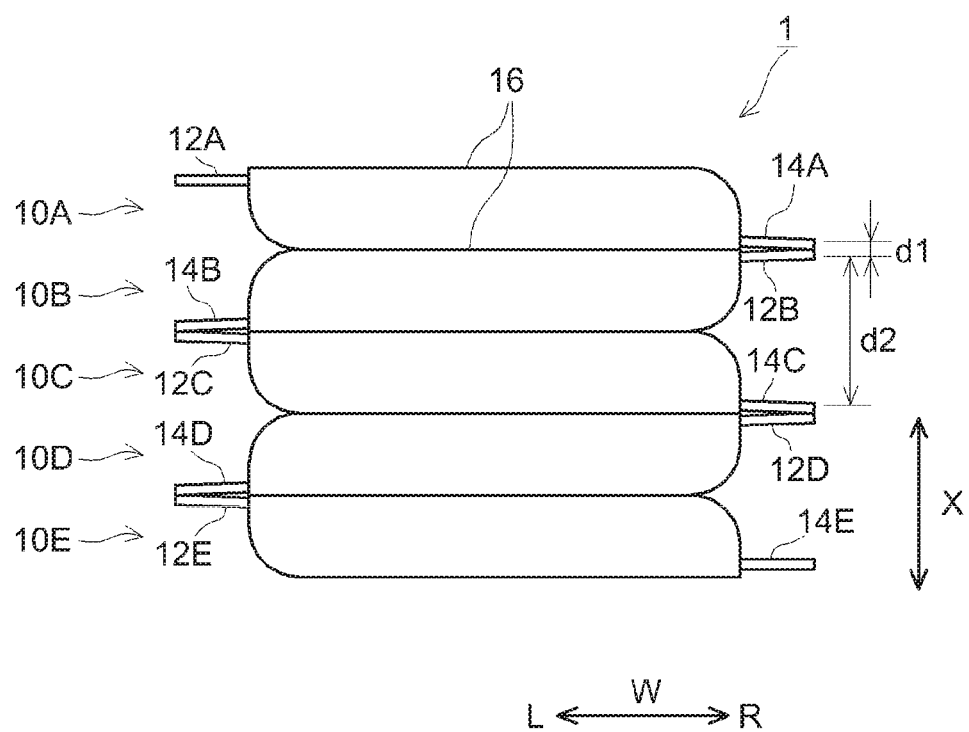
FIG. 1 is a plan view, schematically showing an outline of a battery pack according to an embodiment.

Favorable embodiments of the battery pack disclosed herein are now described hereinafter with appropriate reference to the figures. It should be noted that those matters other than the items mentioned particularly in the present specification, which are required in implementing the present invention (such as a general process for constructing a battery), can be understood as design items of those skilled in the art that are based on the prior art related to this field. The battery pack disclosed herein can be implemented based on the details disclosed in the present specification and common general technical knowledge of the relevant field.

Moreover, in the following figures the members/sections that demonstrate the same effects are applied the same reference numerals; thus, the overlapping descriptions are often omitted or simplified. Also, the dimensional relations (lengths, widths, thicknesses, etc.) shown in each figure are modified for the purpose of easy explanation and do not necessarily reflect the actual dimensional relations. Note that the alphabet "X" in each figure represents an array direction in which laminated batteries are arranged. In addition, the alphabet "W" in each figure represents a width direction of the laminated batteries, which intersects with the array direction X. However, these directions are merely for the purpose of illustration and therefore are not intended to limit the arrangements of the laminated batteries.

FIG. 1 is a plan view that schematically shows an outline of a battery pack 1 according to an embodiment. The battery pack 1 has a plurality of laminated batteries 10A, 10B, 10C, 10D, 10E. The plurality of laminated batteries 10A, 10B, 10C, 10D, 10E are of an identical shape. Each of the laminated batteries 10A, 10B, 10C, 10D, 10E is in the shape of a flat plate. Each of the laminated batteries 10A, 10B, 10C, 10D, 10E has a pair of flat surfaces (wide surfaces) 16. The laminated batteries 10A, 10B, 10C, 10D, 10E are arranged along an array direction X in such a manner that the wide surfaces 16 face each other. The even-numbered laminated batteries along the array direction X, which are the laminated batteries 10B and 10D, are disposed in such a manner that right and left ends thereof in the width direction W are reversed from those of the odd-numbered laminated batteries arranged along the array direction X, which are the laminated batteries 10A, 10C and 10E.

In the present embodiment, the laminated batteries 10A, 10B, 10C, 10D, 10E are in contact with each other, but the laminated batteries 10A, 10B, 10C, 10D, 10E may not be in contact with each other by having, for example, heat dissipation members, spacer members, insulating members or the like disposed therebetween. The number of laminated batteries configuring the battery pack 1 is five in this embodiment but is not limited thereto. The number of laminated batteries configuring the battery pack may be typically ten or more, such as approximately 10 to 100.

Positive electrode terminals 12A, 12B, 12C, 12D, 12E and negative electrode terminals 14A, 14B, 14C, 14D, 14E protrude from outer surface of the laminated batteries 10A, 10B, 10C, 10D, 10E. The positive electrode terminals 12A, 12B, 12C, 12D, 12E and the negative electrode terminals 14A, 14B, 14C, 14D, 14E are disposed facing each other, with the wide surfaces 16 of the laminated batteries 10A, 10B, 10C, 10D, 10E therebetween. Concretely, in the width direction W perpendicular to the array direction X, the positive electrode terminals 12A, 12B, 12C, 12D, 12E and the negative electrode terminals 14A, 14B, 14C, 14D, 14E are disposed at the right and left ends of the laminated batteries 10A, 10B, 10C, 10D, 10E.

In the laminated batteries 10A, 10B, 10C, 10D, 10E, the positions of the positive electrode terminals 12A, 12B, 12C, 12D, 12E in the array direction X are different from those of the negative electrode terminals 14A, 14B, 14C, 14D, 14E. Specifically, the positive electrode terminals 12A, 12B, 12C, 12D, 12E are positioned relatively higher than the negative electrode terminals 14A, 14B, 14C, 14D, 14E in the array direction X, respectively. More specifically, if a center line is drawn to divide each of the laminated batteries 10A, 10B, 10C, 10D, 10E in the array direction X, the positive electrode terminals 12A, 12B, 12C, 12D, 12E are each positioned on the upper side, whereas the negative electrode terminals 14A, 14B, 14C, 14D, 14E are each positioned on the lower side.

Therefore, at the right end portion in the width direction W, a distance from the negative electrode terminals 14A, 14C of the laminated batteries 10A, 10C to the positive electrode terminals 12B, 12D of the laminated batteries 10B, 10D is relatively shorter than a distance from the positive electrode terminals 12B, 12D of the laminated batteries 10B, 10D to the negative electrode terminals 14C, 14E of the laminated batteries 10C, 10E. At the left end portion in the width direction W, on the other hand, a distance from the negative electrode terminals 14B, 14D of the laminated batteries 10B, 10D to the positive electrode terminals 12C, 12E of the laminated batteries 10C, 10E is relatively shorter than a distance from the positive electrode terminals 12A, 12C of the laminated batteries 10A, 10C to the negative electrode terminals 14B, 14D of the laminated batteries 10B, 10D.

The plurality of laminated batteries 10A, 10B, 10C, 10D, 10E are connected in series. The plurality of laminated batteries 10A, 10B, 10C, 10D, 10E are electrically connected to each other directly without having connecting members such as bus bars interposed therebetween.

Specifically, at the right end portion in the width direction W, the negative electrode terminals 14A, 14C of the laminated batteries 10A, 10C are welded to the positive electrode terminals 12B, 12D of the adjacent laminated batteries 10B, 10D respectively. For this reason, the negative electrode terminal 14A and the positive electrode terminal 12B, as well as the negative electrode terminal 14C and the positive electrode terminal 12D, are electrically connected to each other. Furthermore, at the left end portion in the width direction W, the negative electrode terminals 14B, 14D of the laminated batteries 10B, 10D are welded to the positive electrode terminals 12C, 12E of the adjacent laminated batteries 10C, 10E respectively. For this reason, the negative electrode terminal 14B and the positive electrode terminal 12C, as well as the negative electrode terminal 14D and the positive electrode terminal 12E, are electrically connected to each other. The plurality of laminated batteries 10A, 10B, 10C, 10D, 10E are electrically connected to each other while keeping the positive electrode terminals 12B, 12C, 12D, 12E and the negative electrode terminals 14A, 14B, 14C, 14D parallel.

The positive electrode terminal 12A of the laminated battery 10A is a positive electrode output terminal that is opened to be externally connectable. The negative electrode terminal 14E of the laminated battery 10E is a negative electrode output terminal that is opened to be externally connectable.

According to the present embodiment, the distance between the electrically connected positive and negative electrode terminals of adjacent laminated batteries is relatively shorter than the distance between the positive and negative electrode terminals of the same that are not electrically connected to each other.

Taking the laminated battery 10B for example, when the distance between the positive electrode terminal 12B and the negative electrode terminal 14A connected to the positive electrode terminal 12B at the right end portion in the width direction W is represented as "d1" and the distance between the positive electrode terminal 12B and the negative electrode terminal 14C that is not connected to the positive electrode terminal 12B is represented as "d2," the distance d1 is shorter than the distance d2 (d1<d2). By making the distance between the positive electrode terminal 12B and the negative electrode terminal 14A shorter in this manner, the laminated batteries 10A and 10B can effortlessly be connected in series. In other words, when welding the positive electrode terminal 12B and the negative electrode terminal 14A to each other, a load applied to a laminate exterior package 30 (see FIGS. 2 and 3) can be reduced. In addition, the positive electrode terminal 12B and the negative electrode terminal 14A can be joined by larger surface contact, enabling strong joining between the positive electrode terminal 12B and the negative electrode terminal 14A. The laminated battery 10B was taken as an example above but the same applies to the laminated batteries 10C and 10D as well.

A relationship between the distances d1 and d2 depends on the length of an electrode body 20 (see FIGS. 2 and 3) in the array direction X (e g., a thickness of the electrode body 20 in a lamination direction) and therefore is not particularly limited. In general, the longer the length of the electrode body 20 in the array direction X, the greater the difference between the distances d1 and d2. Thus, when the relationship between the distances d1 and d2 is such that approximately 1.5×d1<d2<100×d1, or typically 2×d1<d2, or for example 5×d1<d2, the effect of the technique disclosed herein can be exerted better.

Figure 4:
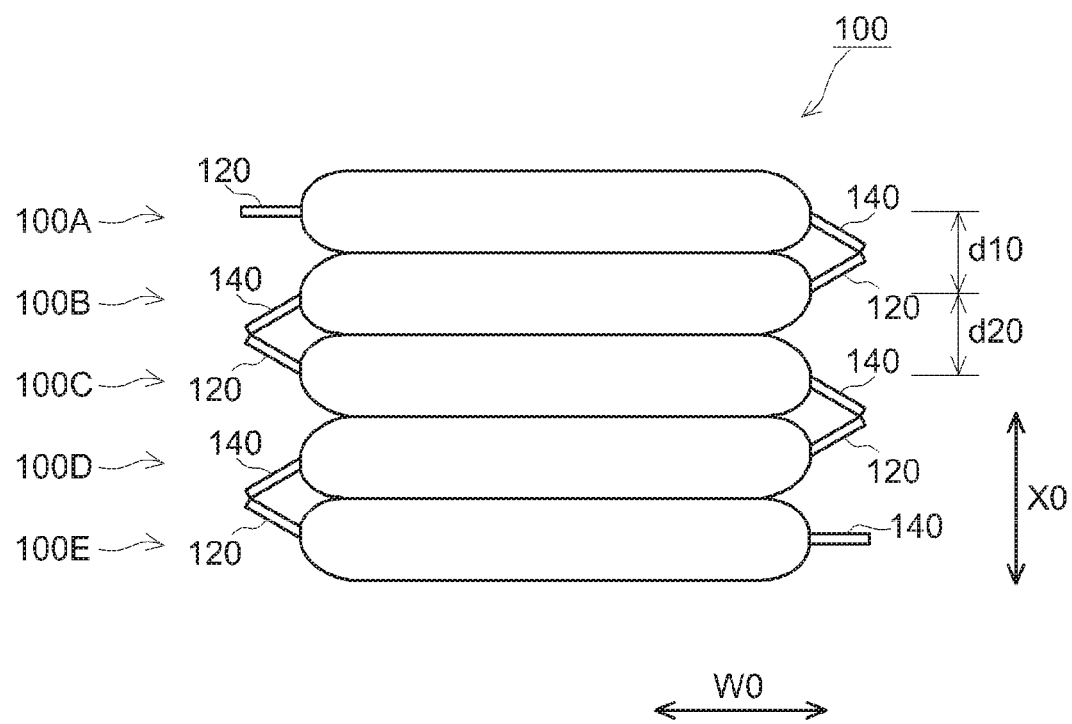
FIG. 4 is a plan view, schematically showing an outline of a conventional battery pack.

In the conventional battery pack 100 shown in FIG. 4, the positive electrode terminals 120 and the negative electrode terminals 140 are disposed at equally spaced intervals at both ends of the battery pack 100 in the width direction W0. Therefore, when the distance between electrically connected positive and negative electrode terminals of adjacent laminated batteries 100A to 100E is represented as "d10" and the distance between positive and negative electrode terminals of the same that are not electrically connected is represented as "d20," the distance d10 and the distance d20 are nearly equal to each other (d10≅d20).

Figure 2:
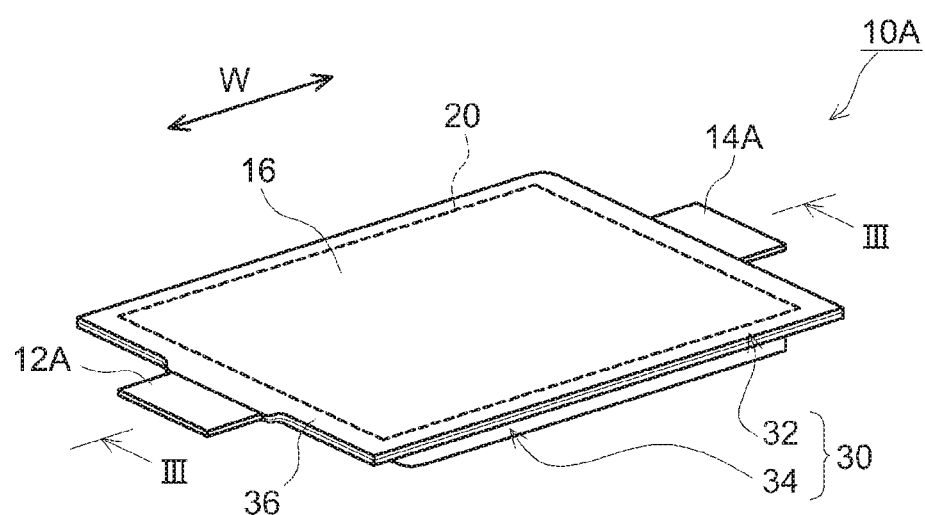
FIG. 2 is a perspective view, schematically showing a laminated battery according to an embodiment.
Figure 3:
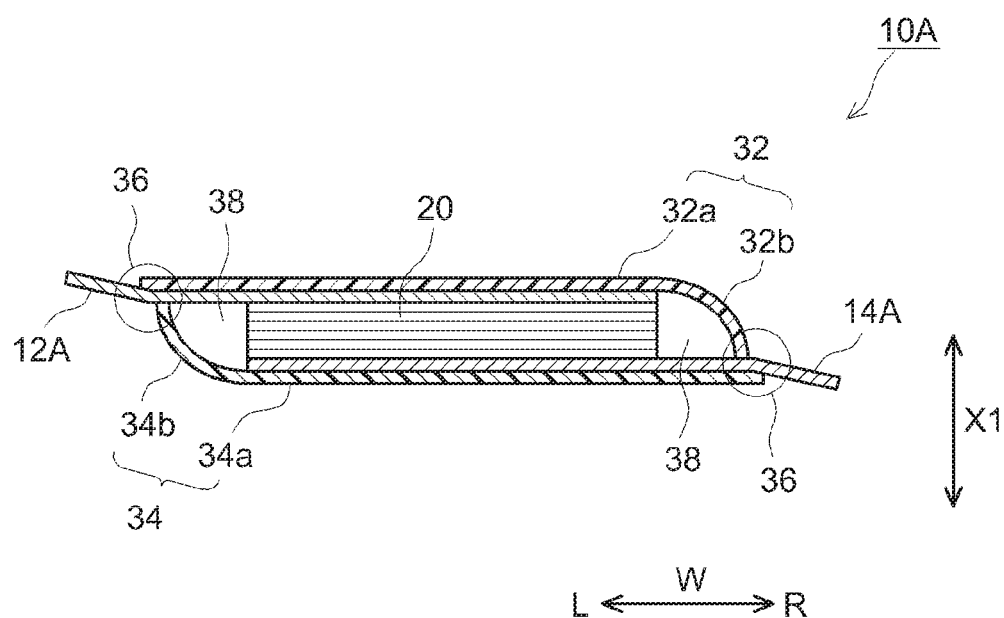
FIG. 3 is a cross-sectional view taken along line III-III of the laminated battery shown in FIG. 2.

FIG. 2 is a perspective view that schematically shows an outline of the laminated battery 10A. FIG. 3 is a cross-sectional view taken along line III-III of the laminated battery 10A. Hereinafter, the components of a laminated battery are described using the laminated battery 10A as an example. However, the laminated batteries 10B, 10C, 10D, and 10E have the same configuration as the laminated battery 10A.

The laminated battery 10A has the electrode body 20, an electrolyte, which is not shown, the positive electrode terminal 12A, the negative electrode terminal 14A, and the laminate exterior package 30. The electrode body 20 and the electrolyte are contained in the laminate exterior package 30.

The configuration of the electrode body 20 may be the same as that of a conventionally known battery, and is not particularly limited. The electrode body 20 is a laminate-type electrode body (laminated electrode body) in this specification. The electrode body 20 has one or more, typically a plurality of, rectangular positive electrode sheets and rectangular negative electrode sheets. A single electrode body 20 normally has ten or more, typically twenty or more, or for example 30 to 100 of positive electrode sheets and negative electrode sheets. The positive electrode sheets and the negative electrode sheets are alternately stacked in a lamination direction X1 while being insulated from each other. The thickness of the electrode body 20 in the lamination direction X1 is typically 5 to 40 mm or, for example, approximately 8 mm to 30 mm. The lamination direction X1 of the electrode body 20 is typically the same as the array direction X of the laminated batteries 10A, 10B, 10C, 10D, 10E of the battery pack 1. However, the lamination direction X1 of the electrode body 20 may be different from the array direction X of the laminated batteries 10A, 10B, 10C, 10D, 10E. The electrode body 20 may be, for example, a wound electrode body in which belt-shaped positive and negative electrode sheets are stacked while being insulated from each other and then wound in a longitudinal direction.

The positive electrode sheets each have, typically, a positive electrode current collector and a positive electrode active material layer formed on a surface of the positive electrode current collector. The positive electrode active material layer contains a positive electrode active material (e.g., a lithium transition metal compound oxide such as a lithium-nickel-cobalt-manganese compound oxide). One or a plurality of positive electrode sheets are electrically connected to the positive electrode terminal 12A on the inside of the laminate exterior package 30. A part of the positive electrode terminal 12A extends to the outside of the laminate exterior package 30. In other words, the positive electrode terminal 12A protrudes to the outside of the laminate exterior package 30.

The negative electrode sheets each have, typically, a negative electrode current collector and a negative electrode active material layer formed on a surface of the negative electrode current collector. The negative electrode active material layer contains a negative electrode active material (e.g., a carbon material such as graphite). One or a plurality of negative electrode sheets are electrically connected to the negative electrode terminal 14A on the inside of the laminate exterior package 30. A part of the negative electrode terminal 14A extends to the outside of the laminate exterior package 30. In other words, the negative electrode terminal 14A protrudes to the outside of the laminate exterior package 30.

A separator sheet may be interposed between each positive electrode sheet and each negative electrode sheet. The separator sheet insulates the positive electrode active material layer and the negative electrode active material layer from each other. Favorable examples of the separator sheet include a resin sheet made of polyethylene (PE) or polypropylene (PP). The separator sheet may be provided with a heat resistant layer containing, for example, an inorganic filler such as alumina as a main component.

The configuration of the electrolyte may be the same as that of a conventionally known laminated battery, and is not particularly limited. The electrolyte may be in the form of a liquid, polymer (gel), or solid. The electrolyte may contain, for example, a non-aqueous solvent such as carbonates or esters, and a supporting electrolyte such as lithium salt that generates a charge carrier.

The positive electrode terminal 12A and the negative electrode terminal 14A are positioned so as to face each other in the width direction W, with the electrode body 20 therebetween. In other words, the negative electrode terminal 14A is positioned on the side opposite to the positive electrode terminal 12A, with the electrode body 20 therebetween. This configuration can improve workability of constructing the battery pack 1, or more specifically, workability of connecting the laminated batteries 10A, 10B, 10C, 10D, 10E in series. In addition, this configuration can favorably realize the battery pack 1 that barely causes a failure such as short circuit. The positions of the positive and negative electrode terminals 12A and 14A in the lamination direction X1 are mutually different. In this example, the positive electrode terminal 12A is positioned relatively higher than the negative electrode terminal 14A in the lamination direction X1.

The laminate exterior package 30 is a bag-shaped container containing the electrode body 20 and the electrolyte. The laminate exterior package 30 of the present embodiment has two laminate films 32, 34. An outline of the laminate films 32, 34 is in a rectangular shape when viewed planarly, as with the positive electrode sheets and the negative electrode sheets. The laminate films 32, 34 configure a laminated structure in which, for example, a nylon layer with a thickness of approximately 10 to 100 µm, an aluminum layer with a thickness of approximately 30 to 150 µm, and a polypropylene layer with a thickness of approximately 10 to 100 µm are stacked in this order. The nylon layer configures an outermost layer of the laminate exterior package 30 and functions to enhance the durability and shock resistance of each of the laminate films 32, 34. The aluminum layer is a layer for enhancing the gas barrier properties and damp-proofness of each of the laminate films 32, 34. The polypropylene layer is a sealant layer for providing each of the laminate films 32, 34 with heat sealing properties.

As shown in FIG. 3, the laminate films 32, 34 have, respectively, flat portions 32a, 34a having linear cross sections, and deformed portions 32b, 34b continuing from the flat portions 32a, 34a and provided at respective ends of the laminate films 32, 34 in the width direction W. The length of the flat portion 32a in the width direction W is the same as or longer than the length of the electrode body 20 in the width direction W and is shorter than, for example, the sum of the lengths of the electrode body 20 and the positive electrode terminal 12A in the width direction W. The length of the flat portion 34a in the width direction W is the same as or longer than the length of the electrode body 20 in the width direction W and is shorter than, for example, the sum of the lengths of the electrode body 20 and the negative electrode terminal 14A in the width direction W. In this embodiment, the lengths of the flat portions 32a, 34a in the width direction W are the same.

The deformed portions 32b, 34b each have a curved (rounded) cross section. The deformed portions 32b, 34b have a predetermined curvature radius. This curvature radius is the same as or greater than, for example, the thickness of the electrode body 20 in the lamination direction X1. In the lamination direction X1, the length from one end of each of the deformed portions 32b, 34b to the other is the same as or longer than the thickness of the electrode body 20. In this embodiment, the lengths from ends on one side of the deformed portions 32b, 34b to ends on the other side in the lamination direction X1 are the same. The deformed portions 32b, 34b are formed by, for example, embossing where the laminate films 32, 34 are impressed into a predetermined mold and then plastically deformed.

The flat portion 32a of the laminate film 32 is disposed in parallel with and along the positive electrode terminal 12A. The flat portion 32a of the laminate film 32 is disposed so as to be flush with the positive electrode terminal 12A. The flat portion 34a of the laminate film 34 is disposed in parallel with and along the negative electrode terminal 14A. The flat portion 34a of the laminate film 34 is disposed so as to be flush with the negative electrode terminal 14A.

The two laminate films 32, 34 are disposed so as to be point-symmetrical with respect to the center of the electrode body 20 taken as the point of symmetry. These two point-symmetrical laminate films 32, 34 are stacked, and the rim sections thereof are thermally adhered to each other, air-tightly sealing the laminate films 32, 34. An adhered portion 36 to which the laminate films 32, 34 are adhered is formed on an outer rim section of the laminate exterior package 30. The adhered portion 36 is provided over the entire circumference of a containing space, i.e., all four sides of the laminate exterior package 30. A space surrounded b laminate films 32, 34 configures the containing space for containing the electrode body 20 and the electrolyte. A part of the containing space that is located in the vicinity of the deformed portions 32b, 34b is a remaining space (dead space) 38 that does not contribute in charging/discharging.

Note that the laminate exterior package 30 has these two laminate films 32, 34 in this embodiment but may be configured with a single laminate film. In such a case, by folding a single laminate film and thermally adhering a din around the folded part, the resultant laminate film can be used in the same manner as the laminate exterior package. The laminate films 32, 34 do not have to have the deformed portions 32b, 34b. In addition, the cross-sectional shapes of the deformed portions 32b, 34b are not limited to the curved shapes and therefore can also be concaved shapes, linear shapes, or the like.

As described above, in the laminated batteries 10A, 10B, 10C, 10D, 10E, the positive electrode terminals 12A, 12B, 12C, 12D and the negative electrode terminals 14B, 14C, 14D, 14E, which are electrically connected to each other in the lamination direction X, are close to each other. In other words, compared to the conventional battery pack 100 in which a positive electrode terminal and a negative electrode terminal that are adjacent to each other in the lamination direction X are disposed at equally spaced intervals, the distances between the positive electrode terminals 12A, 12B, 12C, 12D and the negative electrode terminals 14B, 14C, 14D, 14E, which are electrically connected to each other, are relatively short.

In the battery pack 1, the positive electrode terminals 12B, 12C, 12D, 12E and the negative electrode terminals 14A, 14B, 14C, 14D are positioned parallel to each other and connected in series. Therefore, the load applied to the laminate exterior package 30 can be reduced when welding the positive electrode terminals 12B, 12C, 12D, 12E and the negative electrode terminals 14A, 14B, 14C, 14D to each other. This can prevent a crack from forming in the laminate exterior package 30 and moisture and the like from entering the inside of the laminate exterior package 30. Moreover, according to this aspect, even in, for example, a high-capacity laminated battery in which an electrode body thereof is thick in the lamination direction, positive and negative electrode terminals thereof can be welded favorably.

While applicable in a variety of applications, the battery pack 1 is characterized by its high energy density and power output. Therefore, with full use of these characteristics, the battery pack 1 can favorably be used in applications that require especially high energy densities and high power densities. Specifically, the battery pack 1 can favorably be used in, for example, a high energy density battery having a theoretical capacity of 10 Ah/C, or higher, typically 50 Ah/L or higher, or for example 100 to 200 Ah/L, and a high power density battery that repeats high-rate charge and discharge at a charge and discharge rate of 2 C (1 C means a current value at which a fully charged battery is discharged for one hour) or higher, typically 5 C or higher, or for example 10 to 30 C. The battery pack 1 can also be favorably used as, for example, a power source for a motor (drive power supply) that is installed in a vehicle. The type of the vehicle is not particularly limited, but examples thereof typically include automobiles such as plug-in hybrid vehicles (PHV), hybrid vehicles (HV), and electric vehicles (EV).

The present invention has been described above in detail. However, the foregoing embodiment is merely illustrative, and the invention disclosed herein includes various variations and modifications of the foregoing specific examples.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery pack, comprising:
a plurality of laminated batteries arranged in a predetermined array direction,
wherein the plurality of laminated batteries each have:
a laminate exterior package having a pair of wide surfaces;
the laminate exterior package has first and second films;
an electrode body that is disposed on an inside of the laminate exterior package and has a positive electrode sheet and a negative electrode sheet;
the first and second films each have a flat portion arranged along the pair of wide surfaces and a deformed portion arranged along a thickness direction of the electrode body that defines a space for containing the electrode body, wherein a cross section of the deformed portion is a curved shape having a curvature radius greater than a thickness of the electrode body;
outer rim sections of the first and second films are sealed and the deformed portions are layered point-symmetrically with respect to a center of the electrode body;
an electrolyte that is disposed on the inside of the laminate exterior package;
a positive electrode terminal that is electrically connected to the positive electrode sheet on the inside of the laminate exterior package and partially protrudes to an outside of the laminate exterior package; and
a negative electrode terminal that is electrically connected to the negative electrode sheet on the inside of the laminate exterior package and partially protrudes to the outside of the laminate exterior package, at a side opposite to the positive electrode terminal with respect to the electrode body, and
in the plurality of laminated batteries adjacent to each other in the array direction, the positive electrode terminal and the negative electrode terminal adjacent to each other in the array direction are electrically connected in series via a weld joint part, and
in the array direction, a distance between the positive electrode terminal and the negative electrode terminal that are electrically connected to each other is relatively shorter than a distance between the positive electrode terminal and the negative electrode terminal that, are not electrically connected to each other.

2. The battery pack according to claim 1, wherein
the positive electrode terminal and the negative electrode terminal that are electrically connected to each other are connected directly without having a connecting member therebetween, and
the positive electrode terminal and the negative electrode terminal that are electrically connected to each other are physically in parallel to each other.

3. A laminated battery for serial connection, comprising:
a laminate exterior package having a pair of wide surfaces;
an electrode body that is disposed on an inside of the laminate exterior package and has a positive electrode sheet and a negative electrode sheet;
an electrolyte that is disposed on the inside of the laminate exterior package;
a positive electrode terminal that is electrically connected to the positive electrode sheet on the inside of the laminate exterior package and partially protrudes to an outside of the laminate exterior package, and
a negative electrode terminal that is electrically connected to the negative electrode sheet on the inside of the laminate exterior package and partially protrudes to the outside of the laminate exterior package, at a side opposite to the positive electrode terminal with respect to the electrode body,
wherein in a thickness direction from one of the wide surfaces of the laminate exterior package to the other wide surface, a position of the positive electrode terminal and a position of the negative electrode terminal are mutually different,
wherein
the laminate exterior package has first and second films,
the first and second films each have a flat portion arranged along the wide surfaces and a deformed portion arranged along the thickness direction that configures a space for containing the electrode body, and
outer rim sections of the first and second films are sealed while the deformed portions are layered point-symmetrically with respect to a center of the electrode body; and
a cross-section of the deformed portion is a curved shape having a curvature radius greater than a thickness of the electrode body.

* * * * *